(12) United States Patent
Kuwamori et al.

(10) Patent No.: US 11,835,670 B2
(45) Date of Patent: Dec. 5, 2023

(54) SEISMIC OBSERVATION DEVICE, SEISMIC OBSERVATION METHOD, AND RECORDING MEDIUM IN WHICH SEISMIC OBSERVATION PROGRAM IS RECORDED

(71) Applicants: NEC CORPORATION, Tokyo (JP); JAPAN AGENCY FOR MARINE-EARTH SCIENCE AND TECHNOLOGY, Yokosuka (JP)

(72) Inventors: Naoki Kuwamori, Tokyo (JP); Narumi Takahashi, Yokosuka (JP); Masaru Nakano, Yokosuka (JP); Kentaro Sueki, Yokosuka (JP); Shuichiro Yada, Yokosuka (JP); Yoko Kuwamori, Yokosuka (JP)

(73) Assignees: NEC CORPORATION, Tokyo (JP); JAPAN AGENCY FOR MARINE-EARTH SCIENCE AND TECHNOLOGY, Yokosuka (JP)

( * ) Notice: Subject to any disclaimer, the term of this patent is extended or adjusted under 35 U.S.C. 154(b) by 0 days.

(21) Appl. No.: 17/630,727

(22) PCT Filed: Jul. 28, 2020

(86) PCT No.: PCT/JP2020/028899
§ 371 (c)(1),
(2) Date: Jan. 27, 2022

(87) PCT Pub. No.: WO2021/033503
PCT Pub. Date: Feb. 25, 2021

(65) Prior Publication Data
US 2022/0260737 A1  Aug. 18, 2022

(30) Foreign Application Priority Data

Aug. 20, 2019  (JP) .................. 2019-150632

(51) Int. Cl.
*G01V 1/00*   (2006.01)
*G01V 1/28*   (2006.01)
*G01V 1/30*   (2006.01)

(52) U.S. Cl.
CPC .............. *G01V 1/008* (2013.01); *G01V 1/288* (2013.01); *G01V 1/306* (2013.01)

(58) Field of Classification Search
CPC ......... G01V 1/008; G01V 1/288; G01V 1/306
See application file for complete search history.

(56) References Cited

U.S. PATENT DOCUMENTS 5,373,486 A  12/1994  Dowla et al.
5,490,062 A   2/1996  Leach et al.
(Continued)

FOREIGN PATENT DOCUMENTS

CN  1306282 C   3/2007
CN  101782659 A  7/2010
(Continued)

OTHER PUBLICATIONS

Office Action dated Nov. 3, 2022, issued in Taiwanese Application No. 109126466.
(Continued)

*Primary Examiner* — Elias Desta
(74) *Attorney, Agent, or Firm* — Sughrue Mion, PLLC

(57) ABSTRACT

A seismic observation device includes a data acquisition unit that acquires measurement data from each of a plurality of sensors that measure different types of state quantities related to movement of a ground, and an event determination unit that determines whether or not a predetermined event related to the movement of the ground has occurred on the basis of the measurement data from the plurality of sensors.

6 Claims, 4 Drawing Sheets

(56) References Cited

U.S. PATENT DOCUMENTS

| | | | |
|---|---|---|---|
| 6,792,720 B2 * | 9/2004 | Hocking | G01V 1/008 |
| | | | 52/741.11 |
| 10,317,549 B2 * | 6/2019 | Rawles | G01V 1/307 |
| 2006/0023569 A1 | 2/2006 | Agullo et al. | |
| 2010/0274492 A1 | 10/2010 | Rentsch et al. | |
| 2013/0058192 A1 | 3/2013 | Gateman et al. | |
| 2014/0039800 A1 | 2/2014 | Kikuchi | |
| 2016/0154129 A1 * | 6/2016 | Sayers | E21B 43/26 |
| | | | 702/13 |

FOREIGN PATENT DOCUMENTS

| | | |
|---|---|---|
| CN | 102933985 A | 2/2013 |
| CN | 107807406 A | 3/2018 |
| CN | 108021922 A | 5/2018 |
| CN | 109298452 A | 2/2019 |
| CN | 110065077 A | 7/2019 |
| JP | 10-019654 A | 1/1998 |
| JP | 2003-516516 A | 5/2003 |
| JP | 2005-273188 A | 10/2005 |
| JP | 2005-538277 A | 12/2005 |
| JP | 2007-198813 A | 8/2007 |
| JP | 2008-107225 A | 5/2008 |
| JP | 2010-130451 A | 6/2010 |
| JP | 2010-237153 A | 10/2010 |
| JP | 2012-216158 A | 11/2012 |
| JP | 2013-234933 A | 11/2013 |
| JP | 2014-174128 A | 9/2014 |
| JP | 2014-203184 A | 10/2014 |
| JP | 2016-156712 A | 9/2016 |
| JP | 2017-151047 A | 8/2017 |
| JP | 2018-205176 A | 12/2018 |
| JP | 2019-125306 A | 7/2019 |
| WO | 97/22892 A1 | 6/1997 |
| WO | 02/075363 A1 | 9/2002 |

OTHER PUBLICATIONS

Edoardo Del Rezzo et al., "Discrimination of Earthquakes and Underwater Explosions Using Neural Networks", Bulletin of the Seismological Society of America, 2003, pp. 215-223, vol. 93, No. 1.

S. Scarpetta et al., "Automatic Classification of Seismic Signals at Mt. Vesuvius Volcano, Italy, Using Neural Networks", Bulletin of the Seismological Society of America, 2005, pp. 185-196, vol. 95, No. 1.

International Search Report for PCT/JP2020/028899 dated, Oct. 27, 2020 (PCT/ISA/210).

Communication dated Dec. 13, 2022, issued in Japanese Application No. 2021-540697.

Office Action dated Apr. 4, 2023 in Japanese Application No. 2021-540697.

Taiwanese Office Action dated Jul. 19, 2023 in Taiwanese Application No. 109126466.

Discriminating different type waves from pressure and ground motion observation in the seafloor by DONET cabled observation network. AGU Fall meeting. Abstracts. 2 pages. Dec. 31, 2011

Introduction to the Japanese Ocean Real Time Monitoring System DONET, Recent Developments in World Seismology, Issue 7, pp. 34-40, Jul. 2018.

Office Action dated Sep. 26, 2023 in Chinese Application No. 202080056779.2.

\* cited by examiner

SEISMIC OBSERVATION DEVICE, SEISMIC OBSERVATION METHOD, AND RECORDING MEDIUM IN WHICH SEISMIC OBSERVATION PROGRAM IS RECORDED

CROSS REFERENCE TO RELATED APPLICATIONS

This application is a National Stage of International Application No. PCT/JP2020/028899 filed Jul. 28, 2020, claiming priority based on Japanese Patent Application No. 2019-150632 filed Aug. 20, 2019, the contents of which are incorporated herein by reference.

TECHNICAL FIELD

The present invention relates to a seismic observation device, a seismic observation method, and a recording medium in which a seismic observation program is recorded.

BACKGROUND ART

In relation to seismic observation, Patent Document 1 discloses an automatic floodgate opening/closing system that controls opening and closing of a plurality of floodgates in conjunction with the emergency earthquake prompt report.

Patent Document 2 discloses a communication device that receives information regarding a disaster and outputs a warning sound. After receiving the information regarding the disaster, this communication device outputs a warning sound in a case where there has been no key operation for a predetermined time.

PRIOR ART DOCUMENTS

Patent Documents

[Patent Document 1]
 Japanese Unexamined Patent Application, First Publication No. 2005-273188
[Patent Document 2]
 Japanese Unexamined Patent Application, First Publication No. 2010-130451

SUMMARY OF INVENTION

Problems to be Solved by the Invention

In a case where the occurrence of an earthquake is detected, it is desirable to obtain more information regarding the earthquake, such as the type of the earthquake, in order to analyze the earthquake.

An object of the present invention is to provide a seismic observation device, a seismic observation method, and a recording medium in which a seismic observation program is recorded, capable of solving the above problems.

Means for Solving the Problems

According to a first aspect of the present invention, there is provided a seismic observation device including data acquisition means for acquiring measurement data from each of a plurality of sensors that measure different types of state quantities related to movement of the ground; and event determination means for determining whether or not a predetermined event related to the movement of the ground has occurred on the basis of the measurement data from the plurality of sensors.

According to a second aspect of the present invention, there is provided a seismic observation method including acquiring measurement data from each of a plurality of sensors that measure different types of state quantities related to movement of a ground; and determining whether or not a predetermined event related to the movement of the ground has occurred on the basis of the measurement data from the plurality of sensors.

According to a third aspect of the present invention, there is provided a recording medium in which a seismic observation program is recorded, the program causing a computer to acquire measurement data from each of a plurality of sensors that measure different types of state quantities related to movement of the ground; and determine whether or not a predetermined event related to the movement of the ground has occurred on the basis of the measurement data from the plurality of sensors.

Advantageous Effects of the Invention

According to the present invention, it is possible to provide a seismic observation device capable of obtaining a relatively large amount of information regarding an earthquake that has occurred.

EXAMPLE EMBODIMENTS

Hereinafter, embodiments of the present invention will be described. The following embodiments do not limit the invention according to the claims. Not all combinations of features described in the embodiments are essential to solving means of the invention.

Figure 1:
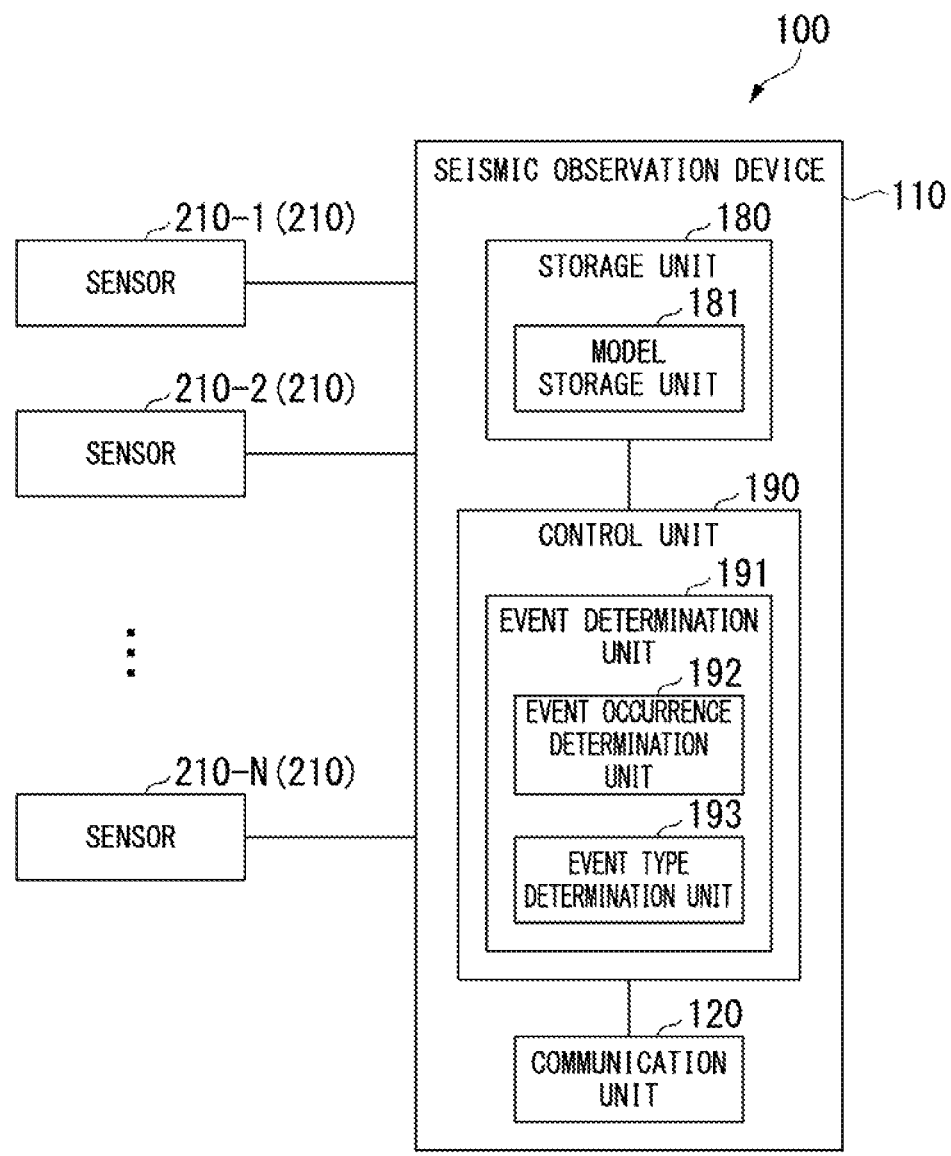
FIG. 1 is a block diagram illustrating a configuration example of a seismic observation system according to an embodiment.

FIG. 1 is a schematic block diagram illustrating a configuration example of a seismic observation system according to the embodiment. As illustrated in FIG. 1, a seismic observation system 100 includes sensors 210-1 to 210-N (where N is an integer of 2 or greater) and a seismic observation device 110. The seismic observation device 110 includes a communication unit 120, a storage unit 180, and a control unit 190. The storage unit 180 includes a model storage unit 181. The control unit 190 includes an event determination unit 191, an event occurrence determination unit 192, and an event type determination unit 193.

The seismic observation system 100 is a system for observing earthquakes.

Each of the sensors 210-1 to 210-N is a sensor that measures a state quantity related to the movement of the ground. The sensors 210-1 to 210-N include different types of sensors. In particular, the sensors 210-1 to 210-N include a water pressure gauge, a fine differential pressure gauge, a seismograph, and a broadband seismograph.

The sensors 210-1 to 210-N are collectively referred to as sensors 210.

The water pressure gauge is a sensor that measures water pressure. In the seismic observation system 100, the water pressure gauge is installed in water such as the seabed to measure changes in water pressure caused by vibrations such as earthquakes. A hydrophone may be used as the water pressure gauge, but the present invention is not limited to this.

The fine differential pressure gauge is a type of water pressure gauge and is installed in water such as the seabed. The fine differential pressure gauge is a sensor capable of measuring a fine pressure (for example, 500 newtons per square meter ($N/m^2$) or less) among differential pressure gauges that measure a pressure difference. In the seismic observation system 100, the fine differential pressure gauge is used as a sensor capable of measuring minute vibrations.

In the following description, general water pressure gauges (water pressure gauges other than the fine differential pressure gauge) will be simply referred to as water pressure gauges. Sensors that measure water pressure, such as general water pressure gauges and fine differential pressure gauges, are collectively referred to as water pressure gauges. In a case where the gauges are particularly required to be differentiated, a general water pressure gauge will be referred to as a normal water pressure gauge.

The seismograph is a sensor that measures a vibration caused by an earthquake or the like. In particular, here, a general seismograph in comparison with a broadband seismograph will be referred to as a seismograph. The general seismograph is more sensitive to relatively high frequency vibrations than the broadband seismograph.

Sensors that measure vibrations such as earthquakes, such as general seismographs and broadband seismographs, will be collectively referred to as seismographs. In a case where the seismographs are particularly required to be differentiated, a general seismograph will be referred to as a normal seismograph.

The broadband seismograph is a sensor capable of measuring vibrations in a relatively wide frequency range. In the seismic observation system 100, a broadband vibrometer is used as a seismograph that is particularly sensitive to relatively low frequency vibrations.

The sensor 210 is installed at an observation point. The observation point referred to here is a point where a sensor for observing shaking (vibration) such as an earthquake is installed. The observation point will also be referred to as a seismic observation point or a seismic intensity observation point. A vibration measured by the sensor at the observation point will also be referred to as a vibration at the observation point.

A plurality of different types of sensors 210 may be installed at one observation point.

The observation point where the water pressure gauge is installed is provided underwater, for example, on the seabed.

Each observation point will also be referred to as a single observation point.

The seismic observation device 110 acquires a sensor measurement value from each sensor 210 and observes an earthquake. The seismic observation device 110 is configured by using a computer such as a workstation or a mainframe.

The seismic observation device 110 distinguishes between a primary wave (P wave) and a secondary wave (S wave) by using a sensor measurement value from a seismograph and a sensor measurement value from a water pressure gauge.

Here, the P wave is a compressional wave, thus propagates in water, and is measured by a water pressure gauge. On the other hand, the S wave is a shear wave, thus does not propagate in water, and is not measured by a water pressure gauge. Therefore, the seismic observation device 110 determines that a seismic wave measured by either the seismograph or the water pressure gauge is a P wave. The seismic observation device 110 determines that a seismic wave measured by the seismograph but not by the water pressure gauge is an S wave.

Generally, the P wave has a smaller amplitude than that of the S wave. Thus, the S wave may be observed, but the P wave may not be observed because it is buried in a noise component. In this case, if the S wave is erroneously determined as being the P wave, the estimation accuracy of the hypocenter is reduced, or the hypocenter cannot be predicted. On the other hand, if the seismic observation device 110 accurately distinguishes between the P wave and the S wave, it is possible to reduce the possibility that the S wave may be erroneously determined as being the P wave. Therefore, it is possible to reduce the possibility that the estimation accuracy of the hypocenter may be reduced or that the hypocenter cannot be predicted.

The seismic observation device 110 detects the occurrence of a submarine landslide by using the sensor measurement value from the water pressure gauge and the sensor measurement value from the fine differential pressure gauge. Vibration frequency bands that can be detected with high sensitivity are different between the water pressure gauge and the fine differential pressure gauge. It is possible to detect a submarine landslide by using the two sensor measurement values.

The submarine landslide may occur in a case where the seafloor topography changes. A tsunami may occur along with the submarine landslide. By discovering the submarine landslide and investigating an area thereof, it is expected that research on deformation of seafloor topography and the occurrence of tsunamis will progress.

The seismic observation device 110 detects the occurrence of an ultra-low frequency earthquake by using a sensor measurement value from a normal seismograph and a sensor measurement value from a broadband seismograph. Vibration frequency bands that can be detected with high sensitivity are different between the normal seismograph and the broadband seismograph. The normal seismograph is more sensitive to vibrations with relatively high frequencies, and the broadband seismograph is more sensitive to vibrations with relatively low frequencies. It is possible to detect ultra-low frequency earthquakes by using the two sensor measurement values. An ultra-low frequency earthquake is an earthquake in which a signal having an ultra-low frequency component (for example, a component lower than about 0.1 hertz (Hz)) is predominant compared with a normal earthquake.

Figure 2:
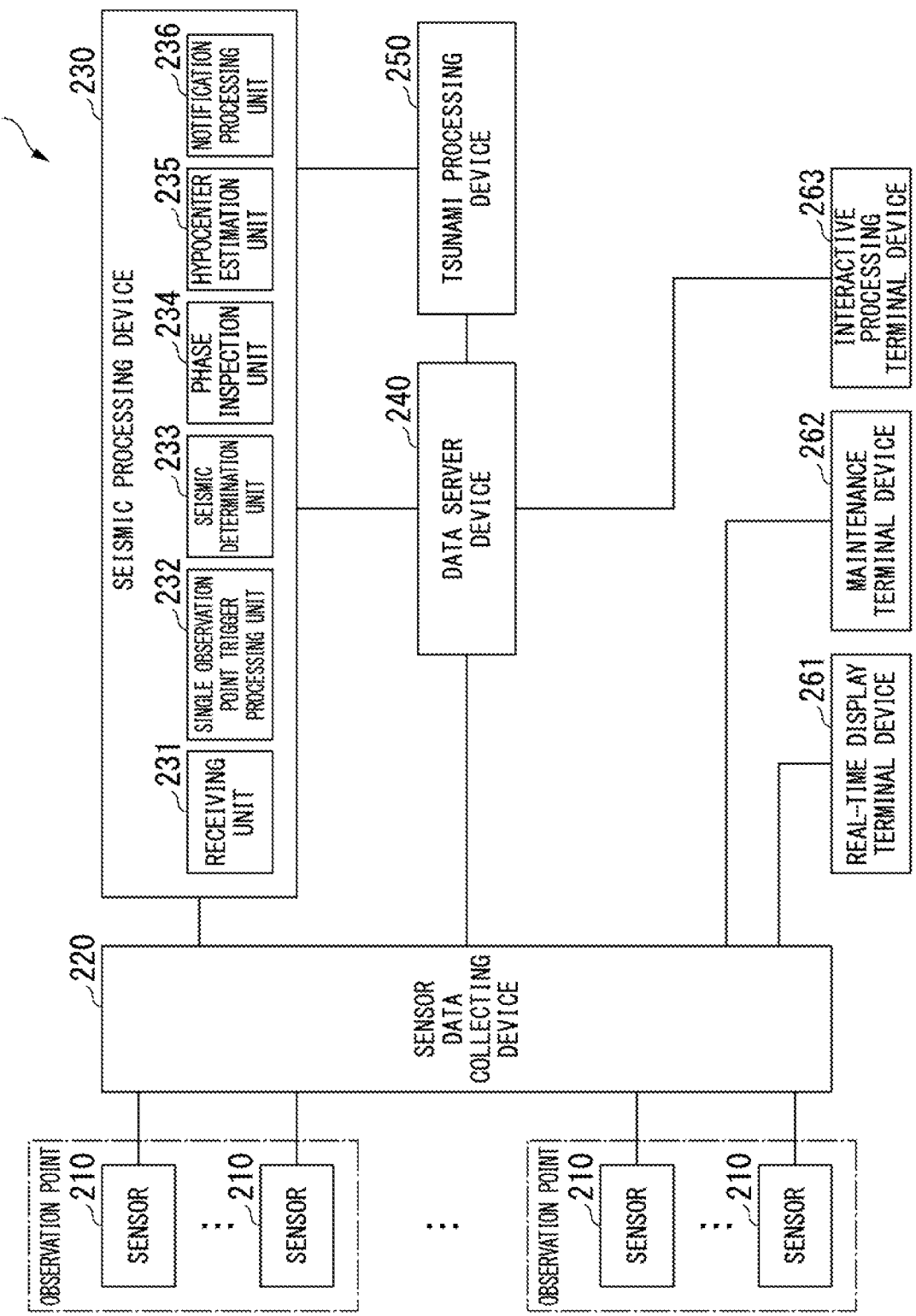
FIG. 2 is a block diagram illustrating an example of a functional configuration of a seismic processing system according to the embodiment.

FIG. 2 is a schematic block diagram illustrating an example of a functional configuration of a seismic processing system according to the embodiment. In the configuration illustrated in FIG. 2, a seismic processing system 1 includes a sensor 210, a sensor data collecting device 220, a seismic processing device 230, a data server device 240, a tsunami processing device 250, a real-time display terminal device 261, a maintenance terminal device 262, and an interactive processing terminal device 263. The seismic processing device 230 includes a receiving unit 231, a single observation point trigger processing unit 232, a seismic determination unit 233, a phase inspection unit 234, a hypocenter estimation unit 235, and a notification processing unit 236.

The sensor 210 is the same as the sensor 210 in FIG. 1, and has the same reference numeral (210) as in the case of FIG. 1, and a description thereof will be omitted here.

The seismic processing device 230, the tsunami processing device 250, and the data server device 240 are configured by using a computer such as a workstation or a mainframe.

The seismic processing system 1 issues the earthquake prompt report when an earthquake occurs. In the seismic processing system 1, the sensor data collecting device 220 collects measurement data from the sensor 210 installed at the observation point, transmits the data to the seismic processing device 230, and registers the data in the data server device 240.

The seismic processing device 230 determines whether or not an earthquake has occurred on the basis of the measurement data from the sensor 210. In a case where it is determined that an earthquake has occurred, the seismic processing device 230 predicts the hypocenter (seismic center) and notifies a notification destination of an estimation result together with tsunami information from the tsunami processing device 250. The notification destination here may be, for example, a terminal device of a person in charge of seismic analysis, or an organization that reports seismic information such as a television station.

The receiving unit 231 receives the measurement data from the sensor 210 from the sensor data collecting device 220 and outputs the data to each unit in the subsequent stage.

The single observation point trigger processing unit 232 determines a trigger for each observation point on the basis of the measurement data from the sensor 210.

The trigger referred to here is a vibration different from a normal vibration (for example, a vibration of which a level is equal to or lower than noise level) that occurs in daily life. When the vibration different from the normal vibration is detected, the seismic processing system 1 or the seismic observation device 110 performs a process for seismic observation on the vibration. In this respect, the vibration different from the normal vibration is a trigger for the seismic processing system 1 and the seismic observation device 110 to perform a process for seismic observation.

Determining the presence or absence of the vibration different from normal vibration will also be referred to as determining a trigger.

Information indicating a trigger detection status such as the presence or absence of trigger detection will be referred to as trigger detection status information.

A vibration cause such as an earthquake (an event that causes a vibration) will be referred to as an event. Each of a submarine landslide and an ultra-low frequency earthquake is an example of an event.

The single observation point trigger processing unit 232 outputs a determination result as trigger detection status information for each observation point. The trigger detection status information referred to here is information indicating whether or not a trigger has been detected at an observation point (that is, whether or not a trigger has been detected).

The seismic determination unit 233 determines whether or not an earthquake has occurred on the basis of determination results of the triggers at a plurality of observation points. For example, the seismic determination unit 233 determines that an earthquake has occurred in a case where a proportion of observation points at which a trigger derived from the earthquake has been determined is equal to or higher than a predetermined proportion among observation points included in a predetermined range.

In a case where the seismic determination unit 233 determines an earthquake has occurred, the phase inspection unit 234 inspects seismic waves (for example, a P wave, an S wave, and a T wave) at respective phases. An existing method may be used as an inspection method.

In a case where the seismic determination unit 233 determines that an earthquake has occurred, the hypocenter estimation unit 235 predicts the hypocenter on the basis of the inspection results by the phase inspection unit 234. An existing method may be used as the method for estimating the hypocenter.

In a case where the seismic determination unit 233 determines that an earthquake has occurred, the notification processing unit 236 notifies a predefined notification destination of the hypocenter predicted by the hypocenter estimation unit 235 and the tsunami information generated by the tsunami processing device 250.

The data server device 240 stores various data related to seismic observation, such as measurement data from the sensor 210. The data server device 240 stores parameter values for the seismic processing device 230 to perform various processes. For example, in a case where the seismic processing device 230 performs a process in each unit by using a trained model based on machine learning, the data server device 240 may store model parameter values of machine learning results.

The tsunami processing device 250 predicts the presence or absence of the occurrence of a tsunami in a case where the seismic determination unit 233 determines that an earthquake has occurred. A well-known method may be used as a method for the tsunami processing device 250 to predict the presence or absence of the occurrence of a tsunami. The tsunami processing device 250 transmits tsunami information indicating an estimation result of the presence or absence of a tsunami to the notification processing unit 236. As described above, the notification processing unit 236 collectively notifies the notification destination of the hypocenter information and the tsunami information.

The real-time display terminal device 261 displays the measurement data from the sensor 210 in real time.

The maintenance terminal device 262 is a terminal device for maintenance of the seismic processing system 1. For example, a maintenance worker of the seismic processing system 1 uses the maintenance terminal device 262 to update the model parameter values stored in the data server device 240. The maintenance worker of the seismic processing system 1 checks whether or not each of the sensors 210 is operating normally by using the maintenance terminal device 262, and performs maintenance of the sensor 210 as necessary.

The interactive processing terminal device 263 interactively presents a part of processing by the seismic processing system 1 that requires manual processing to a user and receives processing by the user. For example, in a case where the user processes the inspection of the phase inspection unit 234, the interactive processing terminal device 263 may display information for inspection such as a seismic waveform and receive the processing by the user.

Among the constituents of the seismic processing system 1, the seismic observation device 110 may perform a part of the function of the single observation point trigger processing unit 232 and a part of the function of the phase inspection unit 234.

Specifically, the seismic observation device 110 may detect the occurrence of a submarine landslide and the occurrence of an ultra-low frequency earthquake as a part of the function of the single observation point trigger processing unit 232. The seismic observation device 110 may detect a P wave and an S wave as a part of the function of the phase inspection unit 234.

The seismic processing device 230 may be configured as one device, and the seismic observation device 110 and a part of the seismic processing device 230 may be correlated with each other. Alternatively, the seismic processing device 230 may be configured as a plurality of devices including the seismic observation device 110.

The communication unit 120 of the seismic observation device 110 (FIG. 1) communicates with other devices. For example, the communication unit 120 receives measurement data from each of the sensors 210 via the sensor data collecting device 220. The sensor 210 corresponds to an example of a data acquisition unit.

The storage unit 180 stores various data. The storage unit 180 is configured by using the storage device included in the seismic observation device 110.

The model storage unit 181 stores a trained model. The trained model referred to here is a model obtained through machine learning. The model storage unit 181 may learn all or some of the processes by the event determination unit 191. The model storage unit 181 stores a trained model obtained as a result of machine learning.

The control unit 190 controls each unit of the seismic observation device 110 to execute various processes. A function of the control unit 190 is executed by a central processing unit (CPU) included in the seismic observation device 110 reading a program from the storage unit 180 and executing the program.

The event determination unit 191 determines whether or not a predetermined event related to the movement of the ground has occurred on the basis of the measurement data from the plurality of sensors 210.

In particular, as described above for the seismic observation device 110, the event determination unit 191 distinguishes between the P wave and the S wave by using the sensor measurement value from the seismograph and the sensor measurement value from the water pressure gauge. The event determination unit 191 detects the occurrence of a submarine landslide by using the sensor measurement value from the water pressure gauge and the sensor measurement value from the fine differential pressure gauge. The event determination unit 191 detects the occurrence of an ultra-low frequency earthquake by using the sensor measurement value from the normal seismograph and the sensor measurement value from the broadband seismograph.

The event occurrence determination unit 192 detects the occurrence of a trigger (a vibration different from the normal vibration) by using the measurement data from at least one sensor 210.

In a case where the event occurrence determination unit 192 has detected a trigger, the event type determination unit 193 detects an event (vibration cause) of the trigger.

In particular, the event type determination unit 193 detects the occurrence of a submarine landslide by using the sensor measurement value from the water pressure gauge and the sensor measurement value from the fine differential pressure gauge. The event type determination unit 193 detects the occurrence of an ultra-low frequency earthquake by using the sensor measurement value from the normal seismograph and the sensor measurement value from the broadband seismograph.

The event type determination unit 193 acquires weather information and detects a case where a vibration is caused by a factor other than an earthquake. For example, when the wind is strong, the water pressure may change due to the influence of waves.

Therefore, in a case where the event type determination unit 193 acquires information indicating that the wind is strong on the water surface for an observation point provided on the seabed, the observation point may be excluded from being a processing target. Consequently, it is possible to reduce the possibility that vibrations caused by factors other than earthquakes may be erroneously determined to be caused by earthquakes.

An information source from which the event type determination unit 193 acquires weather information is not limited to a specific one. For example, a weather sensor (a sensor that measures and outputs weather information such as wind speed) may be provided at the observation point, and the event type determination unit 193 may acquire the weather information from this weather sensor.

The event type determination unit 193 determines whether a seismic wave detected as a trigger is a P wave or an S wave.

The event type determination unit 193 determines whether or not the seismic wave is a succeeding wave.

The succeeding wave referred to here is a seismic wave that is subsequently generated due to a seismic wave that has previously arrived, such as after a seismic wave reaches the observation point, the seismic wave causes another seismic wave on the surface of the earth.

In a case where the process in each unit of the control unit 190 is generated through machine learning, the seismic observation device 110 may execute the machine learning, or a device other than the seismic observation device 110 may perform the machine learning. Hereinafter, a case where a model generation device 300 different from the seismic observation device 110 executes machine learning will be described with reference to FIG. 3.

Figure 3:
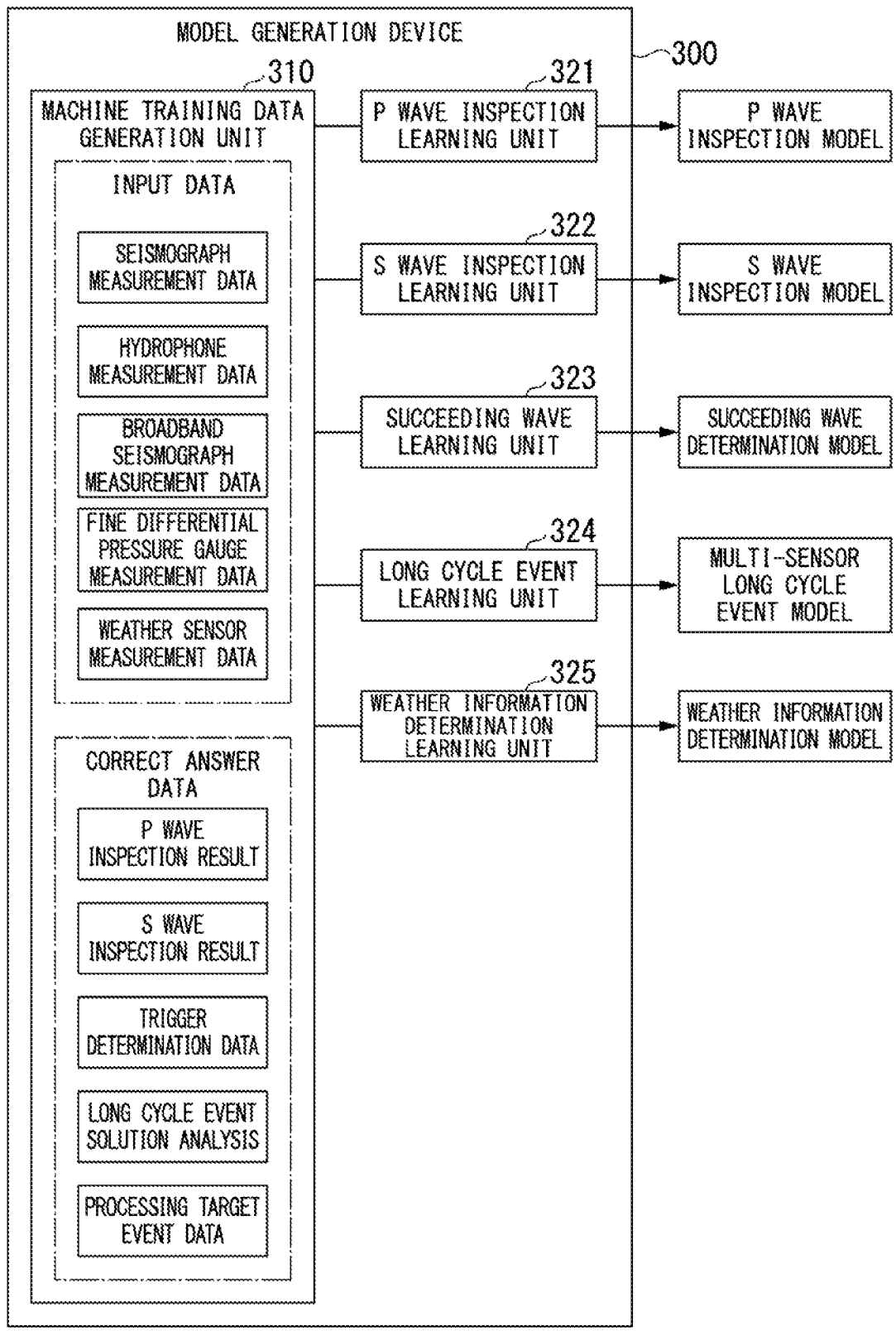
FIG. 3 is a block diagram illustrating an example of a functional configuration of a model generation device according to the embodiment.

FIG. 3 is a schematic block diagram illustrating an example of a functional configuration of the model generation device according to the embodiment.

As illustrated in FIG. 3, the model generation device 300 includes a machine training data generation unit 310, a P wave inspection learning unit 321, an S wave inspection learning unit 322, a succeeding wave learning unit 323, a long cycle event learning unit 324, and a weather information determination learning unit 325.

The model generation device 300 executes machine learning to generate a model used for processing each unit of the control unit 190. The model generation device 300 is configured by using a computer such as a workstation or a mainframe.

The machine training data generation unit 310 generates supervised machine training data.

Specifically, the machine training data generation unit 310 generates training data in which data measured by a seismograph and data measured by a hydrophone (water pressure gauge) are input to a model and an inspection result of a P wave is correct answer data, as training data for detecting the P wave.

The machine training data generation unit 310 generates training data in which data measured by the seismograph and data measured by the hydrophone are input to a model and an inspection result of an S wave is correct answer data, as training data for detecting the S wave.

The machine training data generation unit 310 generates training data in which data measured by the seismograph and data measured by the hydrophone (water pressure gauge) are input to a model and data regarding determination results of a preceding wave and a succeeding wave is correct answer data, as training data for detecting the succeeding wave.

The machine training data generation unit 310 generates training data in which data measured by the water pressure gauge and data measured by the fine differential pressure gauge are input to a model and data regarding an analysis result of a submarine landslide is correct answer data, as training data for detecting the submarine landslide.

The machine training data generation unit 310 generates training data in which data measured by the normal seismograph and data measured by the broadband seismograph are input to a model and data regarding an analysis result of an ultra-low frequency earthquake is correct answer data, as training data for detecting the ultra-low frequency earthquake.

The machine training data generation unit 310 generates training data in which data measured by a vibration sensor such as a water pressure gauge and data measured by a weather sensor are input to a model and data regarding an analysis result of whether or not meteorological noise has occurred is correct answer data, as training data for detecting the meteorological noise. The meteorological noise referred to here is a vibration generated due to a meteorological phenomenon such as a strong wind. In relation to seismic observation, this vibration acts as noise and is thus referred to as meteorological noise.

The P wave inspection learning unit 321 performs machine learning on detection of a P wave by using the training data from the machine training data generation unit 310. A trained model obtained through the machine learning of the P wave inspection learning unit 321 will be referred to as a P wave inspection model. The P wave inspection model is used for the event type determination unit 193 to detect a P wave.

The S wave inspection learning unit 322 performs machine learning on detection of an S wave by using the training data from the machine training data generation unit 310. A trained model obtained through the machine learning of the S wave inspection learning unit 322 will be referred to as an S wave inspection model. The S wave inspection model is used for the event type determination unit 193 to detect an S wave.

The succeeding wave learning unit 323 performs machine learning on detection of a succeeding wave by using the training data from the machine training data generation unit 310. A trained model obtained through the machine learning of the succeeding wave learning unit 323 will be referred to as a succeeding wave determination model. The succeeding wave determination model is used for the event type determination unit 193 to detect a succeeding wave.

The long cycle event learning unit 324 performs machine learning on detection of a submarine landslide and detection of an ultra-low frequency earthquake by using the training data from the machine training data generation unit 310. A trained model obtained through the machine learning of the long cycle event learning unit 324 will be referred to as a multi-sensor long cycle event model. The multi-sensor long cycle event model is used for the event type determination unit 193 to detect a submarine landslide and an ultra-low frequency earthquake.

The long cycle event learning unit 324 may generate each of a model for detecting a submarine landslide and a model for detecting an ultra-low frequency earthquake as multi-sensor long cycle event models. Alternatively, the long cycle event learning unit 324 may generate a single multi-sensor long cycle event model common to detection of a submarine landslide and detection of an ultra-low frequency earthquake.

The weather information determination learning unit 325 performs machine learning on detection of meteorological noise by using the training data from the machine training data generation unit 310. A trained model obtained through the machine learning of the weather information determination learning unit 325 will be referred to as a weather information determination model. The weather information determination model is used for the weather information determination learning unit 325 to detect meteorological noise.

As described above, the communication unit 120 acquires measurement data from each of the plurality of sensors 210 that measure different types of state quantities related to the movement of the ground. The event determination unit 191 determines whether or not a predetermined event related to the movement of the ground has occurred on the basis of the measurement data from the plurality of sensors 210.

According to the seismic observation device 110, a relatively large amount of information regarding an earthquake can be obtained by using different types of state quantities related to the movement of the ground from a plurality of sensors.

the communication unit 120 acquires measurement data from the water pressure gauge and measurement data from the seismograph. The event determination unit 191 determines at least one of the presence or absence of the arrival of a P wave and the presence or absence of the arrival of an S wave.

As a result, the seismic observation device 110 can reduce the possibility that the P wave and the S wave are erroneously determined and the estimation accuracy of the hypocenter is reduced, or the possibility that the hypocenter cannot be predicted.

the communication unit 120 acquires the measurement data from the water pressure gauge and the measurement data from the fine differential pressure gauge.

The event determination unit 191 determines whether or not a submarine landslide has occurred.

The seismic observation device 110 can detect the occurrence of a submarine landslide by using the measurement data from the water pressure gauge and the measurement data from the fine differential pressure gauge. Detection of the occurrence of a submarine landslide can be useful for, for example, research of the occurrence of tsunamis and research of seafloor topography changes.

Next, a configuration of the embodiment of the present invention will be described with reference to FIGS. 4 and 5.

Figure 4:
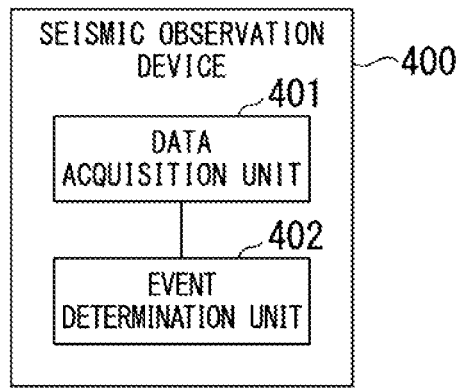
FIG. 4 is a block diagram illustrating a seismic observation device according to an embodiment of the minimum configuration of the present invention.

FIG. 4 is a diagram illustrating a seismic observation device according to an embodiment of the minimum configuration. As illustrated in FIG. 4, a seismic observation device 400 includes a data acquisition unit 401 and an event determination unit 402.

With this configuration, the data acquisition unit 401 acquires measurement data from each of a plurality of sensors that measure different types of state quantities related to the movement of the ground. The event determination unit 402 determines whether or not a predetermined event related to the movement of the ground has occurred on the basis of the measurement data from the plurality of sensors.

According to the seismic observation device 400, a relatively large amount of information regarding an earthquake can be obtained by using different types of state quantities related to the movement of the ground from a plurality of sensors.

Figure 5:
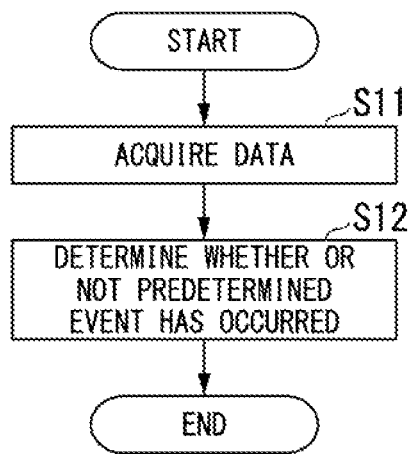
FIG. 5 is a flowchart illustrating a processing procedure in the seismic observation method according to the embodiment of the minimum configuration of the present invention.

FIG. 5 is a diagram illustrating a processing procedure in a seismic observation method according to an embodiment of the minimum configuration.

The process in FIG. 5 includes a data acquisition step (step S11) of acquiring measurement data from a plurality of sensors that measure different types of state quantities related to the movement of the ground, and an event determination step (step S12) of determining the presence or absence of the occurrence of a predetermined event related to the movement of the ground on the basis of the measurement data from the plurality of sensors.

According to the process in FIG. 5, a relatively large amount of information regarding earthquakes can be obtained by using different types of state quantities related to the movement of the ground from a plurality of sensors.

Figure 6:
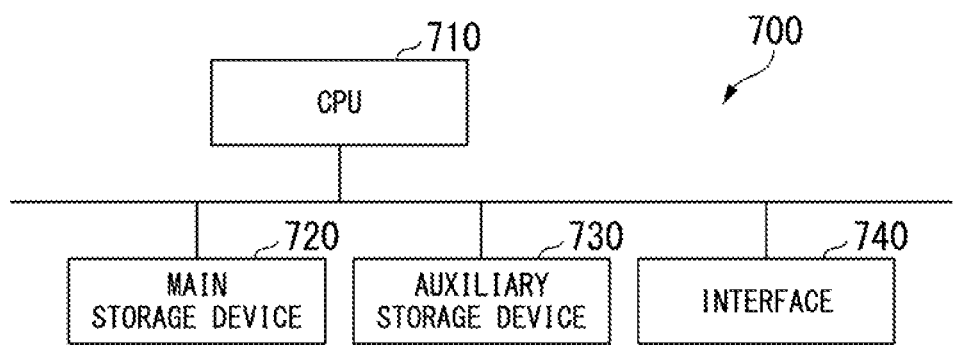
FIG. 6 is a schematic block diagram illustrating a configuration of a computer according to at least one of the above embodiments.

FIG. 6 is a schematic block diagram illustrating a configuration of a computer according to at least one embodiment.

In the configuration illustrated in FIG. 6, a computer 700 includes a central processing unit (CPU) 710, a main storage device 720, an auxiliary storage device 730, and an interface 740.

Any one or more of the seismic observation device 110, the seismic processing device 230, the model generation device 300, and the seismic observation device 400 may be mounted on the computer 700. In that case, an operation of each of the above processing units is stored in the auxiliary storage device 730 in the form of a program. The CPU 710 reads the program from the auxiliary storage device 730, loads the program to the main storage device 720, and executes the above process according to the program. The CPU 710 secures a storage area corresponding to each of the above storage units in the main storage device 720 according to the program.

In a case where the seismic observation device 110 is mounted on the computer 700, operations of the control unit 190 and each unit thereof are stored in the auxiliary storage device 730 in the form of a program. The CPU 710 reads the program from the auxiliary storage device 730, loads the program to the main storage device 720, and executes the processes of the control unit 190 and each unit thereof according to the program.

The CPU 710 secures the storage unit 180 and the storage area corresponding to each unit in the main storage device 720 according to the program. The communication performed by the communication unit 120 is executed by having the interface 740 have a communication function and performing communication according to the control of the CPU 710.

In a case where the seismic processing device 230 is mounted on the computer 700, an operation of each of the single observation point trigger processing unit 232, the seismic determination unit 233, the phase inspection unit 234, the hypocenter estimation unit 235, and the notification processing unit 236 is stored in the auxiliary storage device 730 in the form of a program. The CPU 710 reads the program from the auxiliary storage device 730, loads the program to the main storage device 720, and executes the process in each of the units according to the program. The communication performed by the receiving unit 231 is executed by the interface 740 having a communication function and performing communication under the control of the CPU 710.

In a case where the model generation device 300 is mounted on the computer 700, an operation of each of the machine training data generation unit 310, the P wave inspection learning unit 321 and the S wave inspection learning unit 322, the succeeding wave learning unit 323, the long cycle event learning unit 324, and the weather information determination learning unit 325 is stored in the auxiliary storage device 730 in the form of a program. The CPU 710 reads the program from the auxiliary storage device 730, loads the program to the main storage device 720, and executes the process in each of the units according to the program.

In a case where the seismic observation device 400 is mounted on the computer 700, an operation of the event determination unit 402 is stored in the auxiliary storage device 730 in the form of a program. The CPU 710 reads the program from the auxiliary storage device 730, loads the program to the main storage device 720, and executes the process in the event determination unit 402 according to the program.

The data acquisition performed by the data acquisition unit 401 is executed by the interface 740 having a communication function and performing communication under the control of the CPU 710.

A program for executing all or some of the processes performed by the seismic observation device 110, the seismic processing device 230, the model generation device 300, and the seismic observation device 400 may be recorded on a computer-readable recording medium, and the process in each unit may be performed by reading the program recorded on the recording medium into a computer system and executing the program. The term "computer system" referred to here includes an OS or hardware such as peripheral devices.

The "computer-readable recording medium" refers to a portable medium such as a flexible disk, a magneto-optical disk, a ROM, or a CD-ROM, or a storage device such as a hard disk built into a computer system. The above program may be a program for realizing some of the above functions, and may be a program for realizing the above functions in combination with a program already recorded in the computer system.

Although the embodiments of the present invention have been described in detail with reference to the drawings, a specific configuration is not limited to these embodiments, and includes designs and the like within the scope without departing from the concept of the present invention.

INDUSTRIAL APPLICABILITY

The present invention can be applied to a seismic observation device that measures the seismic intensity of an earthquake and predicts the hypocenter, and according to the present invention, it is possible to obtain a relatively large amount of information regarding an earthquake that has occurred.

DESCRIPTION OF REFERENCE SYMBOLS

1 Seismic processing system
100 Seismic observation system
210 Sensor 110, 400 Seismic observation device
120 Communication unit
180 Storage unit
181 Model storage unit
190 Control unit
191, 402 Event determination unit
192 Event occurrence determination unit
193 Event type determination unit
220 Sensor data collecting device
230 Seismic processing device
231 Receiving unit
232 Single observation point trigger processing unit
233 Seismic determination unit
234 Phase inspection unit
235 Hypocenter estimation unit
236 Notification processing unit
240 Data server device
250 Tsunami processing device
261 Real-time display terminal device
262 Maintenance terminal device
263 Interactive processing terminal device
300 Model generation device
310 Machine training data generation unit
321 P wave inspection learning unit
322 S wave inspection learning unit
323 Succeeding wave learning unit
324 Long cycle event learning unit
325 Weather information determination learning unit
401 Data acquisition unit

The invention claimed is:

1. A seismic observation device comprising:
a memory storing instructions; and
one or more processors connected to the memory and configured to execute the instructions to:
acquire measurement data from each of a plurality of sensors that measure different types of state quantities related to movement of the ground; and
determine whether or not a predetermined event related to the movement of the ground has occurred on the basis of the measurement data from the plurality of sensors,
wherein the one or more processors are configured to further execute the instructions to:
acquire measurement data from a water pressure gauge and measurement data from a seismograph, and
determine at least one of whether or not a P wave has arrived and whether or not an S wave has arrived.

2. A seismic observation device comprising:
a memory storing instructions; and
one or more processors connected to the memory and configured to execute the instructions to:
acquire measurement data from each of a plurality of sensors that measure different types of state quantities related to movement of the ground; and
determine whether or not a predetermined event related to the movement of the ground has occurred on the basis of the measurement data from the plurality of sensors,
wherein the one or more processors are configured to further execute the instructions to:
acquire measurement data from a water pressure gauge and measurement data from a fine differential pressure gauge, and
determine whether or not a submarine landslide has occurred.

3. A seismic observation method comprising:
acquiring measurement data from each of a plurality of sensors that measure different types of state quantities related to movement of a ground, the measurement data being acquired from the plurality of sensors including a water pressure gauge and a seismograph; and
determining whether or not a predetermined event related to the movement of the ground has occurred on the basis of the measurement data from the plurality of sensors, the predetermined event including at least one of an arrival of a P wave and an arrival of an S wave.

4. A non-transitory recording medium in which a seismic observation program is recorded, the program causing a computer to:
acquire measurement data from each of a plurality of sensors that measure different types of state quantities related to movement of the ground, the measurement data being acquired from the plurality of sensors including a water pressure gauge and a seismograph; and
determine whether or not a predetermined event related to the movement of the ground has occurred on the basis of the measurement data from the plurality of sensors, the predetermined event including at least one of an arrival of a P wave and an arrival of an S wave.

5. A seismic observation method comprising:
acquiring measurement data from each of a plurality of sensors that measure different types of state quantities related to movement of a ground, the measurement data being acquired from the plurality of sensors including a water pressure gauge and a fine differential pressure gauge; and
determining whether or not a predetermined event related to the movement of the ground has occurred on the basis of the measurement data from the plurality of sensors, the predetermined event including an occurrence of a submarine landslide.

6. A non-transitory recording medium in which a seismic observation program is recorded, the program causing a computer to:
acquire measurement data from each of a plurality of sensors that measure different types of state quantities related to movement of the ground, the measurement data being acquired from the plurality of sensors including a water pressure gauge and a fine differential pressure gauge; and
determine whether or not a predetermined event related to the movement of the ground has occurred on the basis of the measurement data from the plurality of sensors, the predetermined event including an occurrence of submarine landslide.

* * * * *